United States Patent
Pasta

(10) Patent No.: US 12,074,889 B2
(45) Date of Patent: Aug. 27, 2024

(54) PREVENTING DHCP POOL EXHAUSTION AND STARVATION WITH CENTRALIZED ARP PROTOCOL MESSAGES

(71) Applicant: Fortinet, Inc., Sunnyvale, CA (US)

(72) Inventor: Alessandro Pasta, Villa di Serio (IT)

(73) Assignee: Fortinet, Inc., Sunnyvale, CA (US)

(*) Notice: Subject to any disclaimer, the term of this patent is extended or adjusted under 35 U.S.C. 154(b) by 283 days.

(21) Appl. No.: 17/490,523

(22) Filed: Sep. 30, 2021

(65) Prior Publication Data
US 2023/0098972 A1 Mar. 30, 2023

(51) Int. Cl.
- G06F 21/00 (2013.01)
- H04L 9/40 (2022.01)
- H04L 61/103 (2022.01)
- H04L 61/5014 (2022.01)

(52) U.S. Cl.
CPC ........ H04L 63/1416 (2013.01); H04L 61/103 (2013.01); H04L 61/5014 (2022.05); H04L 63/0236 (2013.01); H04L 63/0263 (2013.01); H04L 63/1425 (2013.01); H04L 63/1483 (2013.01)

(58) Field of Classification Search
None
See application file for complete search history.

(56) References Cited

U.S. PATENT DOCUMENTS

| | | | |
|---|---|---|---|
| 8,046,577 B2* | 10/2011 | Henry | H04L 63/061 713/151 |
| 9,042,306 B2* | 5/2015 | Barkan | H04W 76/12 370/328 |
| 9,203,689 B2* | 12/2015 | Nahum | H04L 41/0803 |
| 9,654,502 B2* | 5/2017 | Thubert | G06F 21/10 |
| 2004/0218614 A1* | 11/2004 | Yokomitsu | H04L 61/2553 370/401 |
| 2005/0122946 A1* | 6/2005 | Won | H04L 61/5061 370/338 |
| 2015/0163100 A1* | 6/2015 | Graf | H04L 41/0886 370/255 |
| 2018/0262428 A1* | 9/2018 | Chirreddy | H04L 61/5007 |
| 2021/0400015 A1* | 12/2021 | Theogaraj | H04L 61/5076 |

* cited by examiner

*Primary Examiner* — Maung T Lwin
(74) *Attorney, Agent, or Firm* — Law Office of Dorian Cartwright; Dorian Cartwright

(57) ABSTRACT

A low number of available Internet Protocol (IP) addresses is detected in an IP pool that available for lease from the Dynamic Host Configuration Protocol (DHCP) server. A neighbor table from a gateway device behind a firewall that blocks Internet Control Message Protocol (ICMP) echo requests from the DHCP server. The gateway device is triggered to broadcast an Address Resolution Protocol (ARP) request to network devices of the neighbor table behind the firewall to determine whether a specific IP address is in use. Responsive to an ARP response not being received, the control module releasing a lease for the specific IP thereby returning to the IP pool available for lease in the DHCP server.

9 Claims, 7 Drawing Sheets

PREVENTING DHCP POOL EXHAUSTION AND STARVATION WITH CENTRALIZED ARP PROTOCOL MESSAGES

FIELD OF THE INVENTION

The invention relates generally to computer networking, and more specifically, to preventing DHCP (dynamic host configuration protocol) exhaustion and starvation with centralized ARP (address resolution protocol) messages.

BACKGROUND

In Wi-Fi networks environment, or in high user mobility networks in general, DHCP pool exhaustion is a known issue. There are a limited number of dynamic IP (Internet protocol) addresses shared between a larger number of clients. When there are more clients wanting connections than there are IP addresses available, some clients will be denied access to the Internet or other IP environments.

The IP address shortage is conventionally prevented or solved in one or more 3 ways: 1) Increase the DHCP pool size higher than the expected user's population; 2) Lower the DHCP lease time, in many cases to sub-hour values; and 3) In case of pool exhaustion, DHCP server test client reachability via ICMP PING, to identify freeable IPs.

However, these conventional solutions have many drawbacks. The DHCP pool size is increased and could be a waste of networks or IP addresses. The lowered lease time could impact both the DHCP Server and network: while decreasing the lease time, the amount of DHCP renewal packets exchanged between Client and Server increase exponentially and based on the number of actual connected devices. And critically, ICMP PING reachability test is not always a viable option because default configuration of Windows or Linux/Android clients have a personal firewall in place that blocks ICMP echo request and are outside of centralized company control. Also, the enterprise or perimetral firewalls, if not correctly configured, could block the ICMP echo requests, leading to a false indication of freeable IPs.

Moreover, the DHCP protocol for both IPv4 and IPv6, as per their RFC definition and Security considerations, are prone to a well know security attack named "DHCP Starvation".

Therefore, what is needed is a robust technique for preventing DHCP exhaustion and starvation with centralized APR protocol messages.

SUMMARY

These shortcomings are addressed by the present disclosure of methods, computer program products, and systems for intelligent selection of transmission type for IEEE 802.11ax Wi-Fi compliant networks based on station characteristics.

In one embodiment, a low number of available IP addresses is detected in an IP pool that available for lease from the DHCP server. A neighbor table from a gateway device behind a firewall that blocks ICMP echo requests from the DHCP server.

In another embodiment, the gateway device is triggered to broadcast an ARP request to network devices of the neighbor table behind the firewall to determine whether a specific IP address is in use. Responsive to an ARP response not being received, the control module releasing a lease for the specific IP thereby returning to the IP pool available for lease in the DHCP server.

Advantageously, computer network performance is improved by ensuring available IP addresses.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for preventing DHCP exhaustion and starvation with centralized ARP messages to check IP lease expirations.

One of ordinary skill in the art will recognize many additional variations made possible by the succinct description of techniques below.

I. Systems for Preventing DHCP Exhaustion (FIGS. 1-2)

Figure 1A:
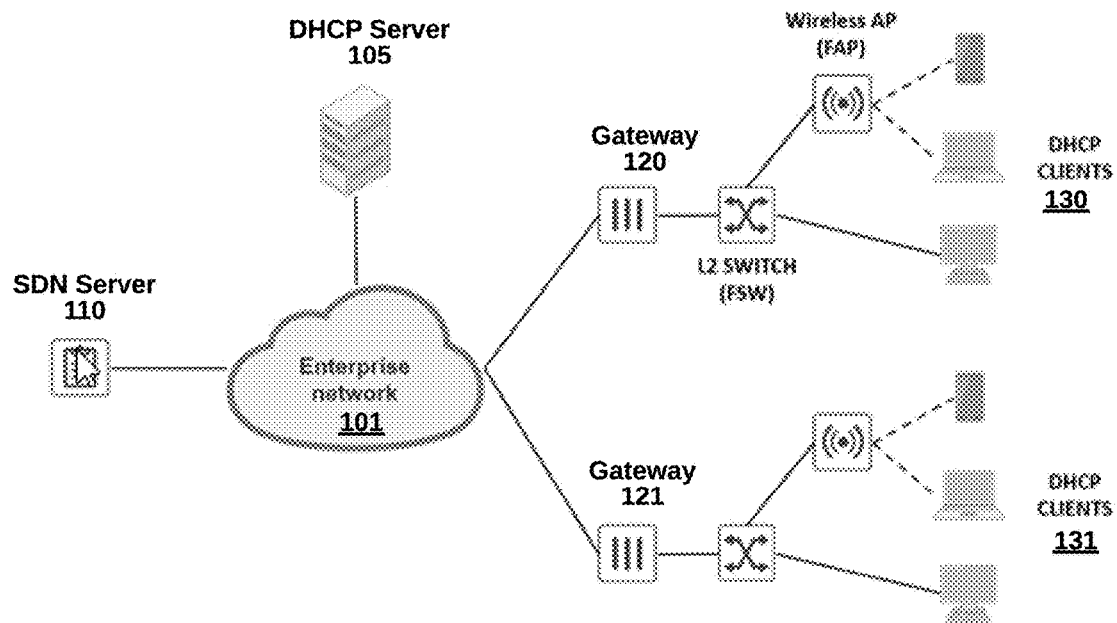
FIGS. 1A-1D are high-level block diagrams illustrating a system for preventing DHCP exhaustion and starvation with centralized ARP messages to check IP lease expirations, according to an embodiment.
Figure 1B:
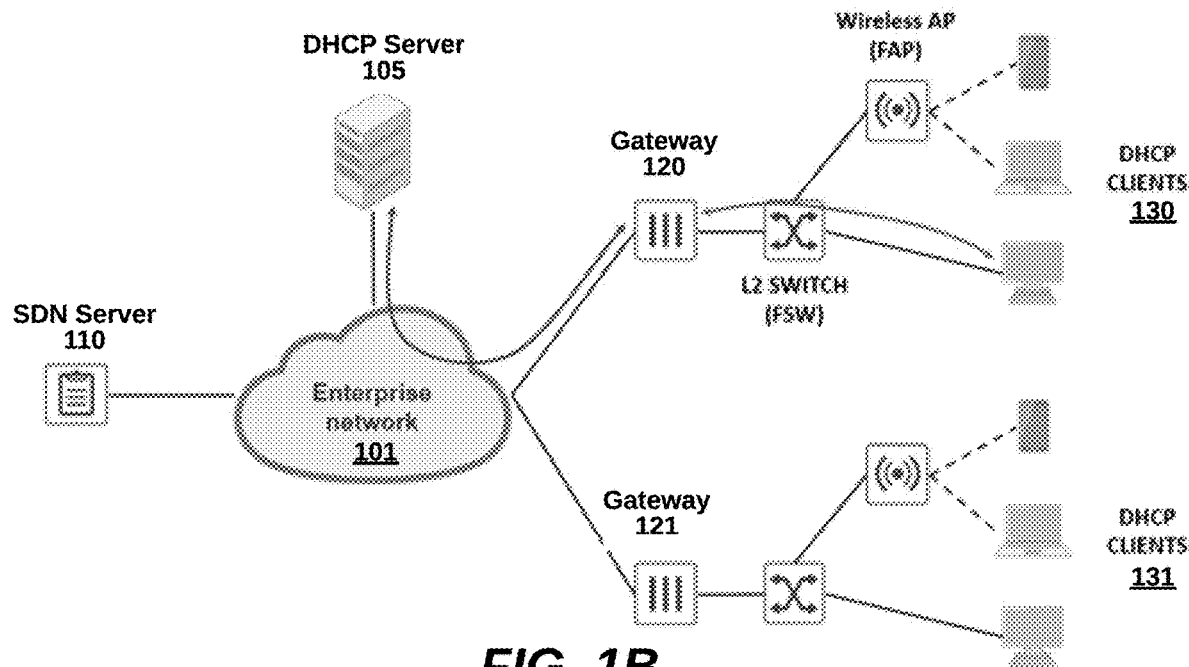
Figure 1C:
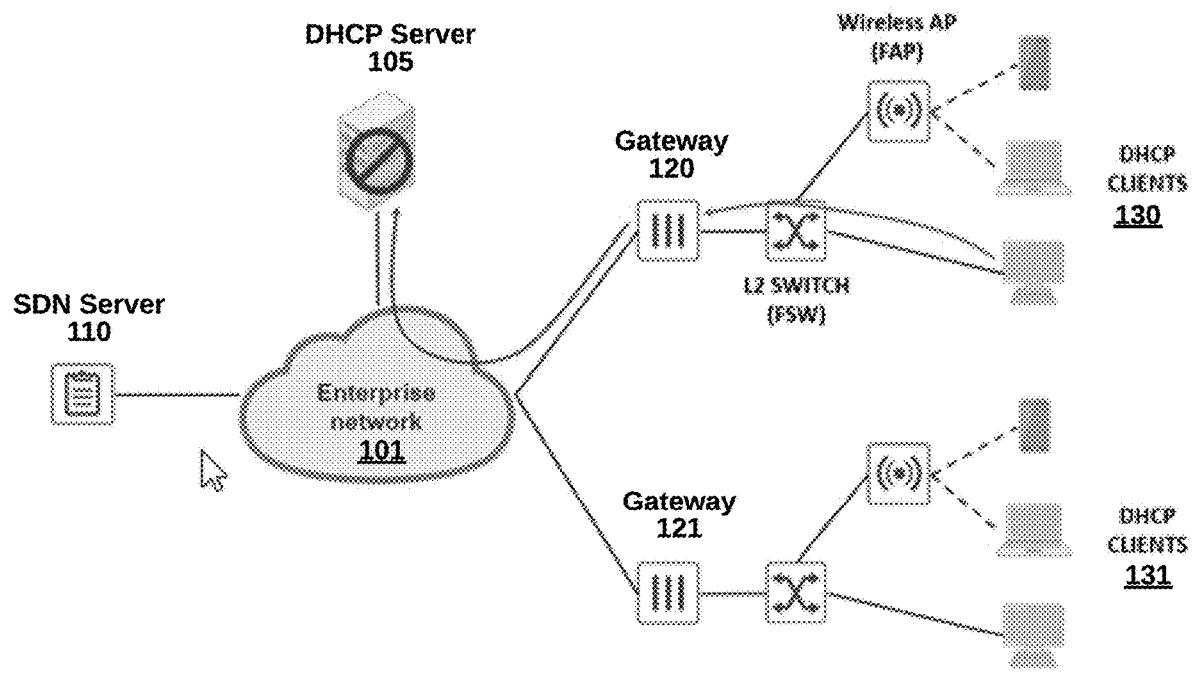
Figure 1D:
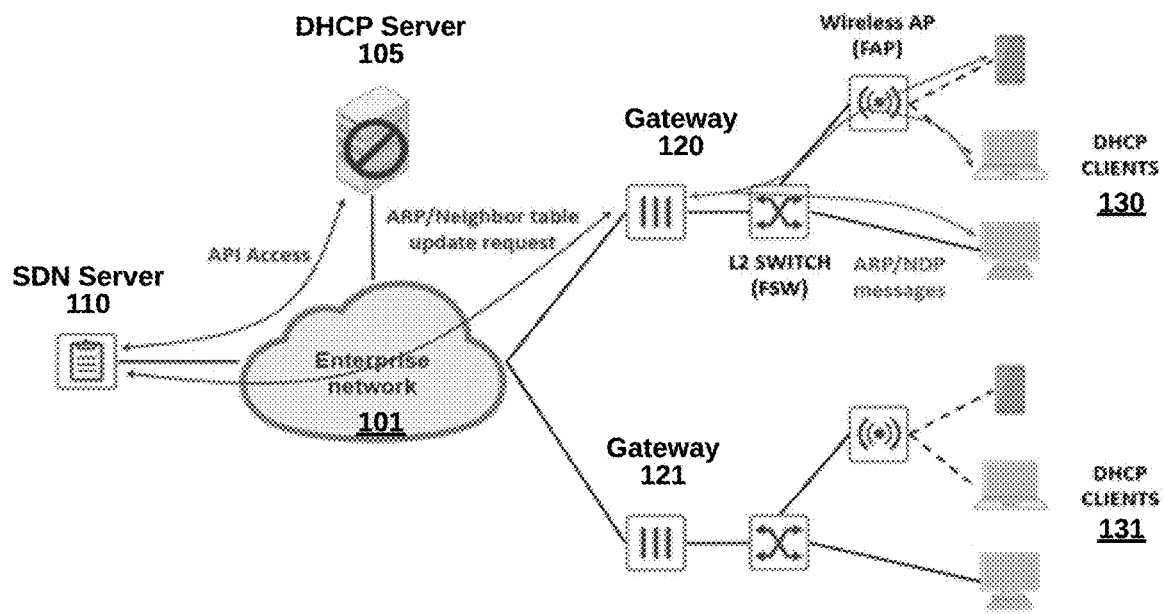
Figure 2:
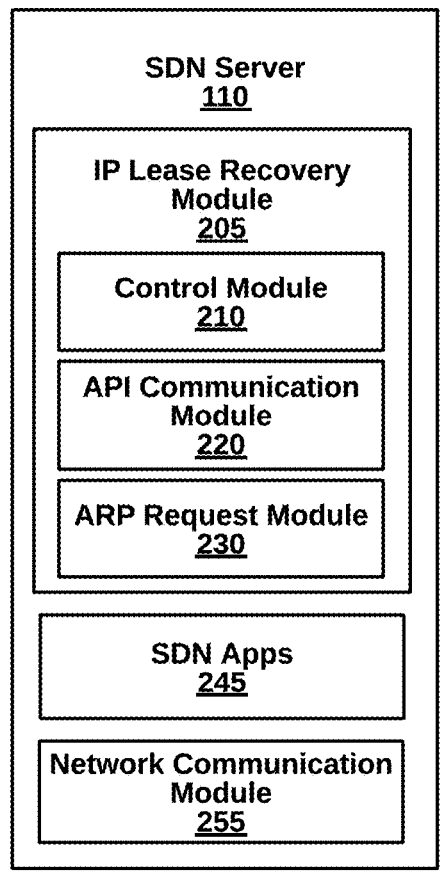
FIG. 2 is a more detailed block diagram illustrating an SDN server of the system, according to an embodiment.
Figure 3:
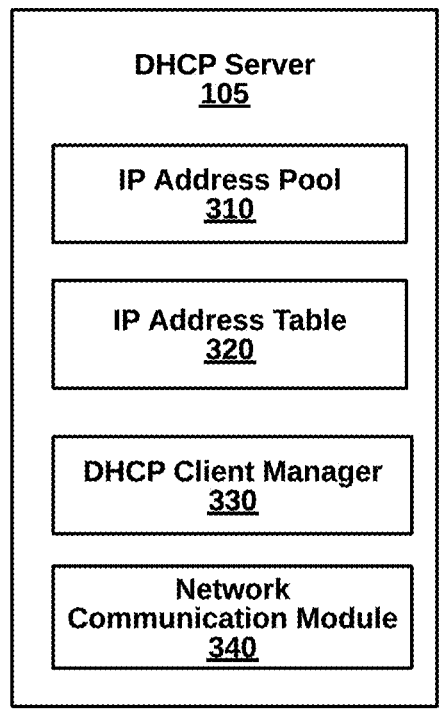
FIG. 3 is a more detailed block diagram illustrating a DHCP server of the system, according to an embodiment.

FIGS. 1A-1D are high-level illustrations of a system 100 for preventing DHCP exhaustion and starvation with centralized ARP (address resolution protocol) messages to check IP lease expirations, according to an embodiment. In one embodiment, SDN (software-defined networking) capabilities are leveraged to bypass firewall blocks of conventional techniques as shown in FIG. 1D because normal operations of FIG. 1B are blocked in FIG. 1C.

FIG. 1A shows an SDN server 110, a DHCP server 105, and gateways 120, 121 are coupled in communication to an enterprise network 101. Other components of the system 100 can include access points, switches and other network devices. DHCP clients 130, 131 are coupled through network devices to the DHCP server 105. The components of the system 100 are coupled in communication over the enterprise network 101. Preferably, the access point 110 connected to the data communication system via hard wire. Other components, such as the headless IoT devices can be connected indirectly via wireless connection. The enterprise network 101 can be any data communication network such as the Internet, a WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, and wired data packets can be formatted according to IEEE 802.3.

In one embodiment, the SDN server 110 bypasses firewall protection to check for use of IP addresses directly on an enterprise network with APR requests or NDP messages (see FIG. 1D). A DHCP server 115 can trigger the APR check when available IP addresses drop below a threshold. To do so, a neighbor table is collected from one or more gateway devices 120 managed by the SDN server 110. The neighbor table in layer 2 of the OSI model connects IP addresses to MAC addresses for local routing operations. The SDN server 110 triggers the gateway 120 to send an APR request broadcast message to the underlying network devices. If an APR reply is received from a network device, the IP address is still in use and if no APR reply is received, the IP address is not still in use and can be returned to the IP pool.

The gateway device 120 implements FHNG (first hop network gateway) security protection to the enterprise network from external threats. The gateway device 120 can also control the behavior of network devices internally. An ARP table is kept as a cache for sending packets to hosts on the enterprise network. Ever changing IP addresses are mapped to a permanent MAC address of a network device. An ARP request packet can be broadcast to all machines an asks if any of the machines are using that particular IP address. When a machine recognizes the IP address as its own, it sends a reply to ARP can update the cache for future reference and proceed with the communication. Host machines unaware of their IP address can use a reverse ARP protocol for discovery. ARP cache size is limited and is periodically cleansed of all entries to free up space. Address thus tent to stay cached for only a few minutes. Frequent updates enable network devices to see when a physical host changes their requested IP addresses. Unused entries are deleted along with any unsuccessful attempts to communicate with computers that are not currently powered on. A proxy ARP enables a network proxy to answer ARP queries for IP addresses that are outside the network and enables packets to be transferred from one subnetwork to another.

The DHCP server 105 is a network server that automatically provides an assigns IP addresses, and other network parameters to client devices, for networks running IPv4 and IPv6. The DHCP server 105 can operate under network standards such as RFC1531, RFC1541 and RFC2131. A pool of IP addresses is managed by the DHCP server 105 including maintaining a table matching leased IP addresses to MAC addresses for network devices on the enterprise network. Some embodiments incorporate the DHCP server 105 with a network router. In normal working condition of FIG. 1B, the DHCP client 130 or 131 obtains IP assignment through DORA (discovery-offer-request-ACK) message exchange. In the implementation of FIG. 1C, the gateway device 120 blocks echo requests from the DHCP server 105. Echo requests sent by the DHCP server 105 through the gateway device 120 may be blocked. One embodiment detects the block and then turns to the SDN server 110 which can include an orchestrator app for handling expired IP addresses.

FIG. 2 is a more detailed illustration of the SDN server 110 of the system 100. The SDN server 110 includes a control module 210, a gateway communication module 220, and an ARP request module 230. The modules can be implemented in source code stored in non-transitory memory executed by a processor. Alternatively, the modules can be implemented in hardware with microcode. The modules can be singular or representative of functionality spread over multiple components. Many other variations are possible.

The control module 210 can detect a low number of available IP addresses in an IP pool that available for lease from the DHCP server. API communications with the DHCP server 115 can include parameters utilized by the control module 210 to recover IP addresses. In other embodiments, IP leases are periodically audited for maintenance. In yet another embodiment, a rate of IP address requests raises a flag for security measures (e.g., to prevent IP address starvation attacks).

The API communication module 220 can use APIs to retrieve a neighbor table from a gateway device behind a firewall that blocks ICMP echo requests from the DHCP server. When gateways join the enterprise network, part of the registration process can be to register with the SDN server 110 and establish a channel for control communications and instructions. The detection of low available IP addresses can lead to a request for an updated table.

In turn, the ARP request module 230 can trigger the gateway device to broadcast an ARP request to network devices of the neighbor table behind the firewall to determine whether a specific IP address is in use. Responsive to an ARP response not being received, the control module 210 releases a lease for the specific IP thereby returning to the IP pool available for lease in the DHCP server.

The SDN server 110 can include various other components for separate network operations executed by different SDN applications 220. In general, an SDN network takes over control plane operations from network devices from centralization. The SDN applications, including the IP exhaustion module 205, are able to leverage this network architecture for access to the SDN compatible gateways.

II. Methods for Preventing DHCP Exhaustion (FIG. 4)

Figure 4:
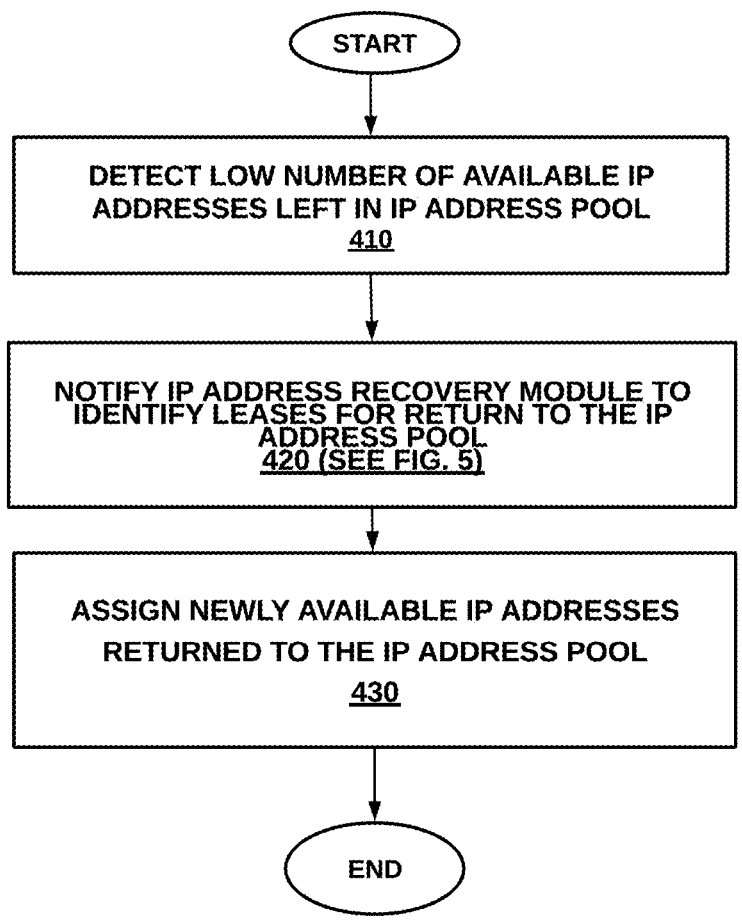
FIG. 4 is a high-level flow diagram illustrating a method for preventing DHCP exhaustion and starvation with centralized ARP messages to check IP lease expirations, according to some embodiments.

FIG. 4 is a high-level flow diagram illustrating a method for preventing DHCP exhaustion and starvation with centralized ARP messages to check IP lease expirations, according to one embodiment. The method 500 can be implemented, for example, by the system 100 above. The steps are merely representative groupings of functionality, as there can be more or fewer steps, and the steps can be performed in different orders. Many other variations of the method 400 are possible.

At step 410, a low number of available IP addresses is detected in an IP pool that available for lease from the DHCP server. As a result, an IP address recovery module is notified to identify expired IP address leases, at step 420. Newly available IP addresses are assigned, at step 430, once returned to the IP address pool due to an expired lease.

Figure 5:
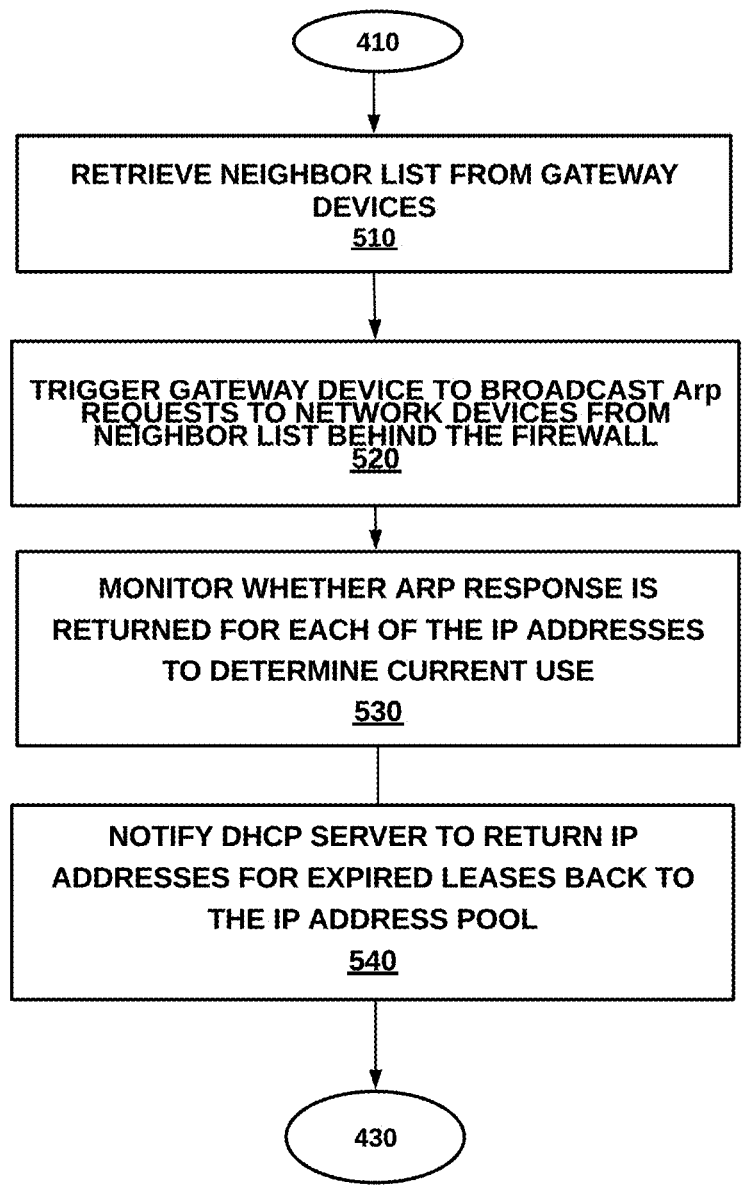
FIG. 5 is a more detailed flow diagram illustrating a step of triggering ARP requests to test IP address use of the method in FIG. 4, according to one preferred embodiment.

More details about the expired lease identification step 420, are set forth in FIG. 5. At step 510, a neighbor table is retrieved from a gateway device behind a firewall that blocks ICMP echo requests from the DHCP server.

At step 520, the gateway device is triggered to broadcast an ARP request to network devices of the neighbor table behind the firewall to determine whether a specific IP address is in use.

At step 530, responsive to an ARP response not being received, a lease for the specific IP is released thereby considered expired, and the DHCP server is notified to return IP addresses for expired leases back to the IP pool, at step 540.

III. Generic Computing Environment (FIG. 6)

Figure 6:
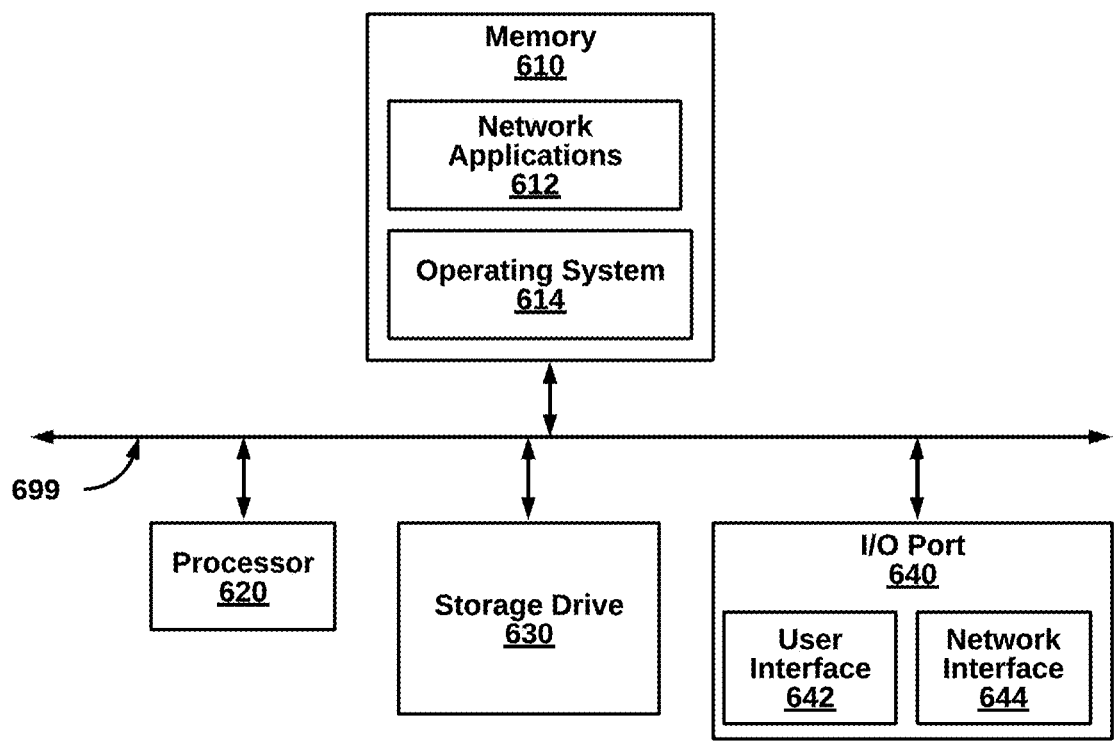
FIG. 6 is a block diagram illustrating a computing environment for implementing hardware, according to one embodiment.

FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., an access point, a firewall device, a gateway, a router, or a wireless station), or a disconnected device (e.g., the SDN server 110, the DHCP server 105 and the gateway devices 120 and 121).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 222 or the storage drive 630.

The storage drive 630 can be any non-volatile type of storage such as a magnetic disc, EEPROM (electronically erasable programmable read-only memory), Flash, or the like. The storage drive 230 stores code and data for applications.

The I/O port 640 further comprises a user interface 242 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An SDN (software-defined networking) server for preventing Dynamic Host Configuration Protocol (DHCP) exhaustion and starvation with centralized ARP (address resolution protocol) messages to check Internet Protocol (IP) lease expirations, the SDN server comprising:
   a processor;
   a network interface, communicatively coupled to the processor; and
   a memory, communicatively coupled to the processor and storing:
      a control module to detect a low number of available IP addresses in an IP pool, wherein the IP addresses are available for lease from a Dynamic Host Configuration Protocol (DHCP) server;
      a gateway communication module to retrieve a neighbor table from a gateway device behind a firewall that blocks Internet Control Message Protocol (ICMP) echo requests from the Dynamic Host Configuration Protocol (DHCP) server; and
      an ARP request module to trigger the gateway device to broadcast an ARP request to network devices of the neighbor table behind the firewall to determine whether each IP address associated with the network devices is in use,
      wherein responsive to an ARP response not being received, the control module releasing a lease for the specific IP thereby returning to the IP pool available for lease in the DHCP server.

2. The SDN server of claim 1, wherein the SDN server and the gateway device communicate over a secure channel.

3. The SDN server of claim 1, wherein the control module uses layer 2 communication of OSI model.

4. The SDN server of claim 1, wherein the DHCP server is integrated within a single physical device with the SDN server and shares a common operating system with the SDN server.

5. The SDN server of claim 1, wherein the IP addresses are dynamic IP addresses.

6. The SDN server of claim 1, wherein the gateway device blocks ICMP echo requests of the DHCP server.

7. The SDN server of claim 1, wherein an IP address starvation attack is detected by a rate of IP address requests, and a IP address flush is initiated to remove falsely used IP addresses.

8. A method in an SDN (software-defined networking) server for preventing Dynamic Host Configuration Protocol (DHCP) exhaustion and starvation with centralized ARP (address resolution protocol) messages to check Internet Protocol (IP) lease expirations, the method comprising the steps of:
   detecting a low number of available IP addresses in an IP pool, wherein the IP addresses are available for lease from a Dynamic Host Configuration Protocol (DHCP) server;
   retrieving a neighbor table from a gateway device behind a firewall that blocks Internet Control Message Protocol (ICMP) echo requests from the Dynamic Host Configuration Protocol (DHCP) server;
   triggering the gateway device to broadcast an ARP request to network devices of the neighbor table behind the firewall to determine whether each IP address associated with the network devices is in use; and
   responsive to an ARP response not being received, releasing a lease for the specific IP thereby returning to the IP pool available for lease in the DHCP server.

9. A non-transitory computer-readable media in an SDN (software-defined networking) server, implemented at least partially in hardware for, when executed by a processor, for preventing Dynamic Host Configuration Protocol (DHCP) exhaustion and starvation with centralized ARP (address resolution protocol) messages to check Internet Protocol (IP) lease expirations, the method comprising the steps of:
   detecting a low number of available IP addresses in an IP pool, wherein the IP addresses are available for lease from a Dynamic Host Configuration Protocol (DHCP) server;
   retrieving a neighbor table from a gateway device behind a firewall that blocks Internet Control Message Protocol (ICMP) echo requests from the Dynamic Host Configuration Protocol (DHCP) server;
   triggering the gateway device to broadcast an ARP request to network devices of the neighbor table behind the firewall to determine whether each IP address associated with the network devices is in use; and
   responsive to an ARP response not being received, releasing a lease for the specific IP thereby returning to the IP pool available for lease in the DHCP server.

* * * * *